(12) United States Patent
Spehl

(10) Patent No.: US 11,172,345 B2
(45) Date of Patent: Nov. 9, 2021

(54) FEEDBACK CHANNEL FOR SECURE DATA TRANSMISSION

(71) Applicant: Audi AG, Ingolstadt (DE)

(72) Inventor: Jürgen Spehl, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/317,355

(22) PCT Filed: Jul. 10, 2017

(86) PCT No.: PCT/EP2017/067205
§ 371 (c)(1),
(2) Date: Jan. 11, 2019

(87) PCT Pub. No.: WO2018/015186
PCT Pub. Date: Jan. 25, 2018

(65) Prior Publication Data
US 2019/0306682 A1 Oct. 3, 2019

(30) Foreign Application Priority Data

Jul. 16, 2016 (DE) .................... 102016008708.0

(51) Int. Cl.
*H04W 4/70* (2018.01)
*H04W 4/46* (2018.01)
(Continued)

(52) U.S. Cl.
CPC ............. *H04W 4/70* (2018.02); *H04L 1/1848* (2013.01); *H04W 4/024* (2018.02); *H04W 4/46* (2018.02); *H04W 8/18* (2013.01); *H04W 76/14* (2018.02)

(58) Field of Classification Search
CPC ......... H04W 4/70; H04W 4/46; H04W 4/024; H04W 76/14; H04W 8/18; H04L 1/1848
See application file for complete search history.

(56) References Cited

U.S. PATENT DOCUMENTS 6,574,668 B1    6/2003  Gubbi et al.
8,081,722 B1 * 12/2011  Furman ................. H04B 1/109
                                                    375/350

(Continued)

FOREIGN PATENT DOCUMENTS

CN   102761351 A   10/2012
CN   102892111 A    1/2013
(Continued)

OTHER PUBLICATIONS

International Search Report and Written Opinion of the International Search Authority directed to related International Patent Application No. PCT/EP2017/067205, dated Jul. 10, 2017, with attached English-language translation; 39 pages.

(Continued)

*Primary Examiner* — Justin T Van Roie
(74) *Attorney, Agent, or Firm* — Sterne, Kessler, Goldstein & Fox P.L.L.C.

(57) ABSTRACT

The present disclosure relates to a method for transmitting at least one data packet between a first communication subscriber of a communication arrangement and at least one second communication subscriber of the communication arrangement, wherein the at least one data packet is transmitted from the first communication subscriber to the second communication subscriber at least partially via a bidirectional direct connection set up between a communication module of the first communication subscriber and a communication module of the at least one second communication subscriber, wherein the first communication subscriber and/or the at least one second communication subscriber is a vehicle, and wherein the at least one second communication subscriber feeds back a receipt for respective data of the at least one data packet to the first communication subscriber.

18 Claims, 2 Drawing Sheets

(51) Int. Cl.
*H04W 4/024* (2018.01)
*H04W 76/14* (2018.01)
*H04W 8/18* (2009.01)
*H04L 1/18* (2006.01)

(56) References Cited

U.S. PATENT DOCUMENTS

| | | |
|---|---|---|
| 9,165,470 B2 | 10/2015 | Mudalige et al. |
| 9,538,374 B2 | 1/2017 | Kaufmann et al. |
| 2013/0022043 A1 | 1/2013 | Lee |
| 2014/0247740 A1* | 9/2014 | Koo ............... H04W 48/18 370/252 |
| 2015/0050906 A1* | 2/2015 | Yuasa ............... H04W 4/46 455/404.2 |
| 2015/0195827 A1* | 7/2015 | Feng ............... H04W 4/40 380/270 |
| 2015/0271247 A1* | 9/2015 | Patsiokas ............... H04W 4/70 709/217 |
| 2016/0018798 A1 | 1/2016 | Jiang et al. |
| 2016/0174122 A1* | 6/2016 | Sorrentino ............ H04W 36/22 370/331 |
| 2016/0309538 A1* | 10/2016 | Chen ............... H04W 24/04 |

FOREIGN PATENT DOCUMENTS

| | | |
|---|---|---|
| CN | 104850012 A | 8/2015 |
| DE | 102011076638 A1 | 11/2012 |
| DE | 102012212681 A1 | 1/2013 |
| DE | 102012011994 A1 | 12/2013 |
| EP | 2854118 A1 | 4/2015 |
| GB | 2427787 A | 1/2007 |
| KR | 20160084340 A * | 7/2016 |
| WO | WO 2015/043813 A1 | 4/2015 |
| WO | WO 2016/108553 A1 | 7/2016 |

OTHER PUBLICATIONS

Qualcomm Incorporated: "V2X Communication in 3GPP", 3GPP TSG-SA WG1 Meeting #68, San Francisco, USA, Nov. 17-21, 2014; 7 pages.

Written Opinion of the International Preliminary Examination Authority directed to related International Patent Application No. PCT/EP2017/067205, dated Jul. 4, 2018, with attached English-language translation; 12 pages.

International Preliminary Report on Patentability directed to related International Patent Application No. PCT/EP2017/067205, completed Nov. 8, 2018, with attached English-language translation; 16 pages.

* cited by examiner

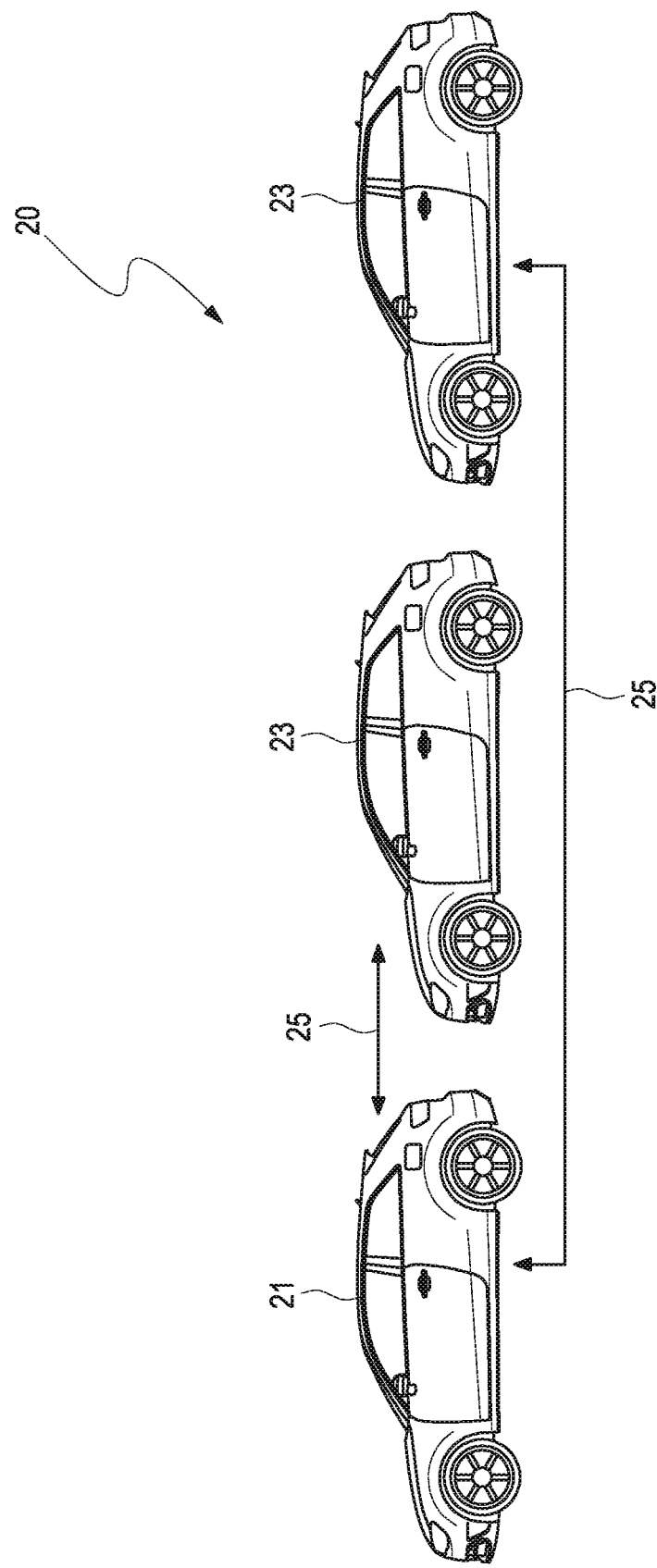

FEEDBACK CHANNEL FOR SECURE DATA TRANSMISSION

TECHNICAL FIELD

The present application relates to a method for transmitting at least one data packet and a communication arrangement.

BACKGROUND

Problems can arise when transmitting data between several communication subscribers, such as a broken connection between the communication subscribers. Because respective data to be transmitted traditionally is sent independently of feedback with a receipt, it can happen that data are not fully transmitted and, for example, a command instruction sent only incompletely arrives to the recipient without a respective sender of the incomplete transmission being informed and possibly wrongly assuming a successful transmission and thus connected configuration changes on the recipient's end.

The German publication DE 10 2012 011 994 A1 discloses a method for exchanging information between vehicles via a temporarily established radio network based, for example, on a Wi-Fi standard.

The German publication DE 10 2011 076 638 A1 discloses a method for exchanging vehicle diagnosis data between a vehicle and a user communication device.

A method for anonymous communication between vehicles is disclosed in the British publication GB 2 427 787 A.

BRIEF DESCRIPTION OF DRAWINGS/FIGURES

FIG. 2 is a further schematic representation of a communication, in accordance with some embodiments.

DETAILED DESCRIPTION

Figure 1:
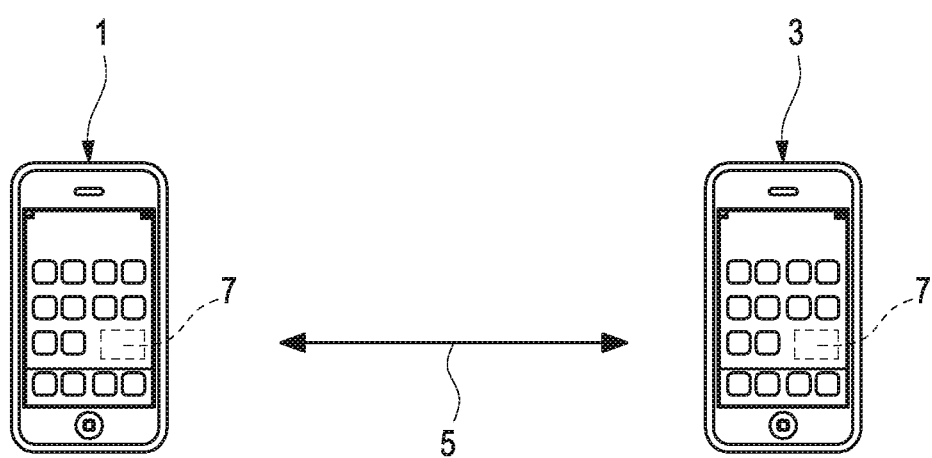
FIG. 1 is a schematic representation of a communication arrangement, in accordance with some embodiments.

A method for transmitting at least one data packet between a first communication subscriber of a communication arrangement and at least one other, e.g., a second communication subscriber of the communication arrangement is presented, wherein the at least one data packet of the first communication subscriber is transmitted to the at least one second communication subscriber at least partially via a bidirectional direct connection set up between a communication module of the first communication subscriber and a communication module of the second communication subscriber, wherein the first communication subscriber and/or the second communication subscriber is a vehicle, and wherein the second communication subscriber feeds back a receipt for respective data of the at least one data packet to the first communication subscriber.

Embodiments result from the description and the enclosed claims.

In accordance with some embodiments, a method is provided for the secure, i.e., particularly complete, transmission of data of a data packet between respective communication subscribers of a communication arrangement comprising at least one vehicle. It is furthermore provided that between the respective communication subscribers, i.e., in particular a sender and a recipient, a bidirectional direct connection is set up, via which the particular information is exchanged via a transmission of respective data of a data packet to be transmitted. This means that feedback to a sender can be provided by a recipient via the bidirectional direct connection such that the sender is informed of a transmission procedure status of respective data of a data packet. The recipient can correspondingly inform the sender or send feedback that respective data of a data packet were fully received so that the sender can confirm or record a successful or complete transmission and, if necessary, transmit further data packets to the recipient, whereby respective data of a data packet to be transmitted can also be transmitted via the direct connection provided for according to the invention.

In accordance with some embodiments, a sender may be a communication subscriber of a communication arrangement that transmits a respective data packet to at least one other, e.g., a second communication subscriber at least partially via the bidirectional direct connection, i.e., in particular a communication connection set up between 5G modules of the sender and the second communication subscriber.

If a data packet was not fully transmitted, a respective recipient provides feedback on this to a respective sender. The recipient requests the non-transmitted data from the sender again. The provided feedback makes it possible for the sender to supply the recipient with data until the latter has received all of the data to be transmitted from a data packet to be transmitted. Furthermore, the sender can, for example, set up a data connection again to transmit the data packet to be transmitted to the recipient.

In accordance with some embodiments, it is possible to perform and record a successful transmission, i.e. a complete transmission of all the data of a data packet to be transmitted. Accordingly, a sender, after receipt of corresponding feedback by a respective recipient, can securely confirm that the data were transmitted and received by the recipient and, if applicable, that the data were applied to the recipient.

In accordance with yet another embodiments, when transmitting sensitive data, e.g., data for predictive driving dynamics interactions for the fully automated steering of a vehicle in a convoy, e.g., driving commands to break, accelerate or change lanes, a confirmation via a transmission of steering commands is of the utmost importance for the safety of man and machine. Thereby, situations in which a sender wrongly assumes a steering command was applied to a recipient are correspondingly avoided. At the same time, authorization profiles can, for example, be set up via the bidirectional direct connection, which make it possible for the sender to transmit steering commands to a recipient.

In accordance with some embodiments, for example, an infrastructure beacon of a street network operator to be chosen as the sender to transmit data for predictive driving dynamics interactions for the fully automated steering of a vehicle.

A narrow-band communication over a so-called "narrow band" may be selected as the bidirectional direct connection.

In accordance with some embodiments, it is possible to exchange data, in particular large quantities of data, in real time with a correspondingly lesser latency of a few milliseconds directly between vehicles and/or communication subscribers, e.g., elements of an infrastructure. For this purpose, a bidirectional communication protocol is implemented between respective communication subscribers for a correspondingly bidirectional direct connection or a so-called "feedback channel." A receipt of respective data packets is fed back via the correspondingly bidirectional direct connection or the so-called "feedback channel" to a respective sending communication subscriber. This means that a control loop is implemented via the bidirectional direct connection, via which a data transmission can be regulated and controlled.

In accordance with some embodiments, the at least one other communication subscriber, e.g., a second communication subscriber, i.e., the recipient, exclusively feeds back a receipt for respective data of the at least one data packet via the bidirectional direct connection to the first communication subscriber, i.e., the sender, when all the data of the at least one data packet were received, and wherein the first communication subscriber transmits the at least one data packet to the second communication subscriber again and creates an error message when the second communication subscriber does not provide feedback within a predetermined time window.

To report a successful transmission of a first data packet to a respective sender and, dependent upon this, for the sender to continue communicating, for example, a steering command building upon the first data packet, the recipient reports a successful transmission to the sender when all the data of the first data packet were received. Additionally, at the start of the transmission of the first data packet, information, for example about a size or any other technically oriented property, can be transmitted to evaluate the completeness of a data packet from the sender to the recipient, through which the recipient can determine the completeness of the first data packet.

In accordance with some embodiments, the recipient determines that a data packet was not fully transmitted, for example, was not fully transmitted within a predetermined time window, the recipient transmits feedback to the sender concerning a failed transmission so that the sender either records a failed transmission and correspondingly avoids further communication or starts the original data transmission again.

In accordance with some embodiments, a respective recipient transmits feedback on a successful transmission to a respective sender only when respective data or corresponding steering commands were applied to the recipient. Particularly with steering commands to control a vehicle, for example, the sender can continue communication with the recipient via knowledge of the currently applied steering commands and steer the recipient via complex series of steering commands that build on one another.

In accordance with yet another embodiment, a part of the data packet is transmitted via a bidirectional direct connection set up respectively between respective communication subscribers and a further part of the data packet is transmitted via a mobile communications network.

In accordance with some embodiments, a faster and more reliable transmission compared to using only one communication channel can be achieved through a division of data of a respective data packet to be transmitted. An LTE connection to a mobile communications network, for example, may be chosen as an another communication channel.

In accordance with some embodiments, respective data to be transmitted may be divided across various communication channels depending on the content of the data, i.e., across the bidirectional direct connection or a communication channel set up by a mobile communications networks. A transmission protocol may be transmitted via the bidirectional direct connection and a respective part of the data packet comprising respective information to be transmitted may be transmitted via the mobile communications network.

In accordance with some embodiments, the first communication subscriber and the at least one other subscriber, e.g., a second communication subscriber exchange a transfer protocol on respective transmitted data, which were transmitted, for example, via the bidirectional direct connection or a further data connection, via the bidirectional direct connection.

In accordance with some embodiments, a transfer protocol comprising, for example, information on a size or any other technically oriented parameter to assess the completeness of a respective data packet, may be used to check or mutually record, i.e., both by a sender and by a recipient, a data packet transmission process. Moreover, respective received data can also be compared to data provided in the transfer protocol and be checked for their completeness.

In accordance with yet another embodiment, for a plurality of second communication subscribers, one bidirectional direct connection between the first communication subscriber and a respective second communication subscriber of the plurality of second communication subscribers are respectively used to transmit respective feedback.

To avoid interference of respective information on respective feedback in a complex communication arrangement with multiple recipients and guarantee data security of a communication between the sender and a respective recipient, the sender may set up an individual bidirectional direct connection with each recipient using respective 5G modules.

In accordance with some embodiments, a 5G module may act as a communication module that meets a 5G standard and, conditional upon this, is configured so that, if needed, a bidirectional direct connection to a further 5G module can be created via an additional side channel to a connection with a mobile communications network, wherein the bidirectional direct connection is exclusively managed through respective 5G modules in communication with one another.

In accordance with some embodiments, respective 5G modules for communication between several vehicles are used without a mobile communications network being interconnected.

In accordance with yet another embodiment, a communication between the first communication subscriber and the at least one other subscriber, e.g., a second communication subscriber via the bidirectional direct connection is controlled by the first communication subscriber, the second communication subscriber or the first communication subscriber and the second communication subscriber together.

In accordance with some embodiments, the bidirectional direct connection may be provided to be controlled by respective communication subscribers themselves. A sender, for example, may transmit their communication information to a respective recipient and may set up the bidirectional direct connection. The recipient can also transmit their communication information to the sender and set up the bidirectional direct connection.

In yet another embodiment, data from the following list of data are transmitted as at least one data packet: 3D camera data, radar images, raw sensor data, steering commands to move a vehicle, access data for a locking system, steering commands for vehicle components, steering commands for components of a networked infrastructure of an apartment, GPS data, updates, configuration data, remote control commands to control electronic devices, communication data and information for an electronic payment process.

In accordance with some embodiments, for the secure management of a communication with individual recipients, i.e., recipients that require individual steering commands, a broadcast method cannot be used for control, wherein respectively same data are transmitted to a plurality of recipients. Moreover, the feedback makes it possible to inform a sender about a destination or use of respective sent data to a respective recipient, unlike in a broadcast method.

The embodiments disclosed herein may be used to exchange data between vehicles, e.g., to transmit steering commands for autonomous driving. The embodiments disclosed herein may also be used for controlling, i.e., remotely controlling, a networked infrastructure, for example, e.g., a smart home or a networked structure over a so-called "Internet of things" (IoT) or to transmit payment information during an electronic payment method to pay a toll, a parking fee, a loan fee for a vehicle or a route guidance service, for example.

In yet another embodiment, a vehicle is chosen as the first communication subscriber, called the master vehicle of a convoy, wherein predictive driving dynamics steering commands are transmitted to further vehicles in the convoy, called slaves, as at least one data packet.

In accordance with some embodiments, 5G modules or 4.5G (also known as LTE-Advanced Pro) modules may be used to set up a side channel, i.e. an second communication channel in addition to a first communication channel, in particular a bidirectional direct connection. Respective LTE modules of several smartphones, for example, can exchange data with one another via the bidirectional direct connection without a connection between the smartphones needing to exist via a mobile communication network. The bidirectional direct connection can also be used to transmit information if a mobile communication network is currently malfunctioning or if respective LTE modules are currently outside a network coverage area.

In accordance with some embodiments, an application can be used to transmit data. The application may be, e.g., one to transmit payment information processed on a mobile or stationary processing unit, wherein it can be determined via the application, for example, which communication subscriber is acting as the sender and which communication subscriber is acting as the recipient. Via the application, functions of a motor vehicle or a smart home, e.g., lights or air conditioning units, can be controlled via the bidirectional direct connection.

In accordance with some embodiments, a communication arrangement with a first communication subscriber and at least one other communication subscriber, e.g., a second communication subscriber, may be present or created, wherein the first communication subscriber is configured to transmit at least one data packet to the second communication subscriber at least partially via a bidirectional direct connection set up between a first respective 5G communication module of the first communication subscriber and of the second communication subscriber, and wherein the second communication subscriber is configured to feed back a receipt for respective data of the at least one data packet to the first communication subscriber, wherein the first communication subscriber and/or the second communication subscriber is a vehicle.

The communication arrangement presented is provided in accordance with embodiments disclosed herein.

Further advantages and embodiments result from the description and the accompanying illustrations.

It is understood that the above-mentioned features and those to be explained below can be used not only in the respectively provided combination but also in other combinations or individually without transcending the scope of the disclosure made herein.

The disclosure is now made using the illustrations in accordance with the embodiments FIG. 1 is a schematic representation of a communication arrangement, in accordance with some embodiments. In FIG. 1, a communication arrangement with a sender 1 and a recipient 3 is shown.

The sender 1 and the recipient 3 each mutually exchange data via a bidirectional direct connection 5 between respective 5G modules 7. To securely transmit a data packet from the sender 1 to the recipient 3, i.e. to guarantee a transmission of the data packet from the sender 1 to the recipient 3, the sender 1 first transmits the data packet to the recipient 3 via the bidirectional direct connection 5. Furthermore, the sender 1 transmits a request for confirmation of a complete receipt of the data packet to the recipient 3 via the bidirectional direct connection 5. Moreover, the sender 1 transmits information concerning the size of the data packet to the recipient 3 via the bidirectional direct connection 5.

Once the recipient 3 has received the data packet in the size that was sent by the sender 1, the recipient 3 transmits a confirmation message to the sender 1 via the bidirectional direct connection. Based on the confirmation message, which may, for example, comprise a transfer protocol on the time and size of respective received data, the sender 1 is informed that the data packet has arrived completely to the recipient 3.

Furthermore, the transfer protocol may comprise information about whether respective steering commands comprised in the data packet are performed by or applied to the recipient 3. The sender 1 is correspondingly informed by the confirmation message about the state or configuration the recipient 3 is currently in.

Based on the knowledge of the sender 1 concerning the state of the recipient 3, the sender 1 can generate further steering commands and transmit these in further data packets to the recipient 3. Due to the confirmation message, a risk is avoided of transmitting respective steering commands without previously necessary steering commands being received by or applied to the recipient 3.

FIG. 2 is another schematic representation of a communication arrangement, in accordance with some embodiments. In FIG. 2, a communication arrangement 20 comprises a vehicle 21 configured as the master and multiple vehicles 23 configured as slaves.

The vehicle 21 forms a column with the vehicles 23. To steer the vehicles 23 so that they drive with the shortest possible distance between them and to utilize a slipstream of a vehicle in a respectively anterior position, the vehicle 21 transmits predictive driving dynamics steering commands, e.g. braking or steering commands and route information, to the vehicles 23. In addition, the vehicle 21 connects to the vehicles 23 via respective bidirectional direct connections 25 and transmits corresponding data packets comprising the braking or steering commands and route information to the vehicles 23.

Once a respective vehicle 23 has received and applied respective braking or steering commands and route information via a respective bidirectional direct connection 25, the vehicle 23 transmits a respective confirmation message to the vehicle 21 via the respective bidirectional direct connection 25 so that the vehicle 21 is informed about the configuration state of the vehicle 23. Subject to the configuration state of the vehicle 23, the vehicle 21 generates further steering commands and transmits these to the vehicle 23.

The invention claimed is:

1. A method, comprising:

transmitting, from a first communication module of a first communication subscriber node of a communication topology to a first communication module of at least one second communication subscriber node of a plurality of second communication subscriber nodes of the communication topology, at least one data packet;

verifying, by the at least one second communication subscriber node, a receipt status for two or more parts of the at least one data packet being received in a predetermined time window, wherein at least one part of the two or more parts of the at least one data packet is transmitted over a mobile communication network and at least one other part of the two or more parts of the at least one data packet is transmitted over a narrow-band communication network; and in accordance with the receipt status of the two or more parts of the at least one data packet, providing, from the at least one second communication subscriber node to the first communication subscriber node, feedback on a receipt of the at least one data packet, the feedback informing a transmission procedure status of the at least one data packet, wherein the first communication subscriber node is a vehicle, wherein the at least one second communication subscriber node is part of a networked infrastructure, and wherein the at least one part of the two or more parts of the at least one data packet transmitted over the narrow-band communication network is transmitted via a bidirectional connection that is a connection via a side channel, and the at least one other part of the two or more parts of the at least one data packet that is transmitted via the mobile communication network is transmitted via a cell phone network, and wherein the bidirectional connection is a connection via the side channel that does not use the cell phone network.

2. The method of claim 1, wherein the networked infrastructure is at least one of an apartment, an Internet of Things (IoT), or an infrastructure to perform electronic payment process.

3. The method of claim 1, wherein the bidirectional connection is a direct bidirectional connection between the first communication module of the first communication subscriber node and the first communication module of the at least one second communication subscriber node.

4. The method of claim 1, further comprising:
communicating, from the first communication subscriber node to the at least one second communication subscriber node, to control the networked infrastructure of an apartment.

5. The method of claim 1, further comprising:
communicating, from the first communication subscriber node to the at least one second communication subscriber node, to control the networked infrastructure of an Internet-of-Things (IoT).

6. The method of claim 1, further comprising:
communicating, from the first communication subscriber node to the at least one second communication subscriber node, to transmit payment information via an electronic payment process.

7. The method of claim 6, wherein the payment information is provided to pay at least one of: a toll, a parking fee, a loan fee, and route guidance service.

8. The method of claim 1, further comprising:
transmitting, from the first communication subscriber node to the at least one second communication subscriber node, a control command as the at least one data packet for controlling at least one component of the networked infrastructure.

9. The method of claim 1, further comprising:
transmitting, from the first communication subscriber node to the at least one second communication subscriber node, a remote control command as the at least one data packet for controlling at least one electronic device of the networked infrastructure.

10. The method of claim 1, further comprising:
transmitting, from the first communication subscriber node to the at least one second communication subscriber node, information for an electronic payment process as the at least one data packet.

11. The method of claim 1, wherein the first communication module of the first communication subscriber node and the first communication module of the at least one second communication subscriber node are 5G communication modules.

12. The method of claim 1, wherein the at least one data packet is a transmission protocol packet.

13. A communication topology, comprising:

a first communication subscriber node; and at least one second communication subscriber node of a plurality of second communication subscriber nodes, wherein the first communication subscriber node is configured to:

transmit, from a first communication module of a first communication subscriber node to a first communication module of at least one second communication subscriber node, at least one data packet, wherein the at least one second communication subscriber node is configured to:

verify, by the at least one second communication subscriber node, a receipt status for two or more parts of the at least one data packet being received in a predetermined time window, wherein at least one part of the two or more parts of the at least one data packet is transmitted over a mobile communication network and at least one other part of the two or more parts of the at least one data packet is transmitted over a narrow-band communication network, and in accordance with the receipt status of the two or more parts of the at least one data packet, provide, from the at least one second communication subscriber node to the first communication subscriber node, feedback on a receipt of the at least one data packet, the feedback informing a transmission procedure status of the at least one data packet, wherein the first communication subscriber node is a vehicle, wherein the at least one second communication subscriber node is part of a networked infrastructure, and wherein the at least one part of the two or more parts of the at least one data packet transmitted over the narrow-band communication network is transmitted via a bidirectional connection that is a connection via a side channel, and the at least one other part of the two or more parts of the at least one data packet that is transmitted via the mobile communication network is transmitted via a cell phone network, and wherein the bidirectional connection is a connection via the side channel that does not use the cell phone network.

14. The communication topology of claim 13, wherein the networked infrastructure is of an apartment, the apartment comprising electronic devices, wherein the electronic devices are one of lights or air conditioning units, and wherein the electronic devices are controlled or remotely controlled by the transmitted at least one data packet.

15. The communication topology of claim 13, wherein the bidirectional connection is a direct bidirectional connection between the first communication module of the first communication subscriber node and the first communication module of the at least one second communication subscriber node.

16. The communication topology of claim 13, wherein the first communication module of the first communication subscriber node and the first communication module of the at least one second communication subscriber node are 5G communication modules.

17. The communication topology of claim 13, wherein the at least one data packet is a transmission protocol packet.

18. The communication topology of claim 14, wherein the networked infrastructure of the apartment is a smart home.

\* \* \* \* \*